Dec. 3, 1940.　　　　E. M. SPLAINE　　　　2,223,646
OPHTHALMIC MOUNTING
Filed Jan. 3, 1938
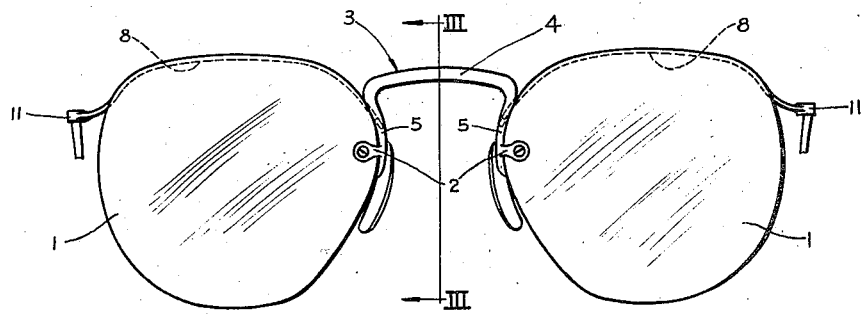
Fig. I
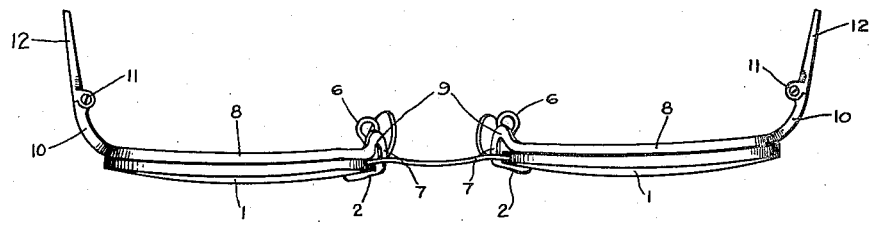
Fig. II
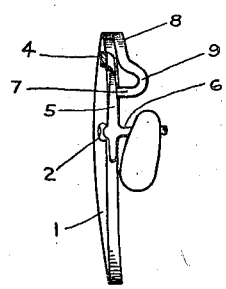
Fig. III
INVENTOR
*Edward M. Splaine*
BY
*Harry H. Styll.*
ATTORNEY Patented Dec. 3, 1940

2,223,646

UNITED STATES PATENT OFFICE 2,223,646

OPHTHALMIC MOUNTING

Edward M. Splaine, Southbridge, Mass., assignor to American Optical Company, Southbridge, Mass., a voluntary association of Massachusetts Application January 3, 1938, Serial No. 182,935

2 Claims. (Cl. 88—47)

This invention relates to improvements in ophthalmic mountings and has particular reference to improved means.

One of the principal objects of the invention is to provide an ophthalmic mounting having adjustable supporting means which may be adjusted to a desired relation with lenses of different sizes and shapes and to meet the facial requirements of different individuals.

Another object is to provide a novel support for lenses of a rimless type ophthalmic mounting for removing strain on said lenses which might be created by displacement of the temples of the mountings in the act of placing the mounting on the face of the wearer or removing the mounting from the face.

Another object is to provide a construction of ophthalmic mounting wherein the usual required accuracy of the assemblage of parts is overcome through the provision of adjustable means by which with slight errors in the fittings may be compensated for.

Another object is to provide a rimless type mounting wherein the various parts thereof, including the lenses, bridge, nose pads and temples, may be quickly and easily adjusted to the facial requirements of different individuals.

Another object is to provide adjustable supports for the temples or sides of rimless type mountings.

Another object is to provide resilient temple supports or supports having portions thereof formed pliable and adjustable and other portions thereof formed resilient and yielding.

Another object is to provide an ophthalmic mounting of the above character with a bridge member having a resilient central arch portion in combination with relatively long adjustable temple supports.

Another object is to provide an ophthalmic mounting of the above character wherein the temple supporting portions emanating from the bridge member will be relatively invisible when the mounting is viewed from the front.

Other objects and advantages of the invention should become apparent from the following description taken in connection with the accompanying drawing, and it will be apparent that many changes may be made in the details of construction, and arrangement of parts, shown and described without departing from the spirit of the invention as expressed in the accompanying claims. I, therefore, do not wish to be limited to the exact details shown and described, as the preferred form only has been given by way of illustration.

Referring to the drawing:

Fig. I is a front elevation of an ophthalmic mounting embodying the invention;

Fig. II is a plan view of the device shown in Fig. I; and

Fig. III is a sectional view taken as on line III—III of Fig. I and looking in the direction indicated by the arrows.

In order to meet the requirements of different individuals, it is necessary in forming ophthalmic mountings to provide lenses of different sizes and contour shapes. It has been usual in the past to provide separate frame supports for said lenses graded in sizes and lens supporting rims of different contour shapes simulating the sizes and contour shapes of the lenses which are to be positioned and held in said supports.

The present invention is, therefore, directed particularly to overcoming the necessity of providing ophthalmic mountings of different sizes through the provision of a support which may be adjusted to the dimensional and shape requirements of the lenses and also to meet the different facial requirements of different individuals. The invention also has as one of its primary objects the provision of temple supports which may be adjusted as specified above, and which will relieve substantially all strain on the lenses when the mounting is being placed on or removed from the face. Another outstanding feature of the present invention is the provision of an ophthalmic mounting wherein practically all of the supporting parts of the mounting are positioned above and outside of the direct field of vision.

Referring more particularly to the drawing wherein like characters of reference designate like parts throughout the several views, the device embodying the invention as shown in Fig. I comprises broadly a pair of lenses 1, connected, as by means of suitable lens straps 2, adjacent the nasal sides thereof, to a bridge member 3. The bridge member has a central arch portion 4 which may be formed relatively rigid or resilient, as desired. The said central arch portion terminates in depending side portions 5 which are shaped substantially to the adjacent contour shape of the peripheral edges of the lenses. It will be noted by reference to Fig. III that the depending side portions 5, which are preferably formed relatively rigid, lie substantially in the plane of the lenses and provide attaching means to which the nose pad supporting arms 6 may be attached adjacent the lower end thereof and provide a relatively long portion intermediate the lens straps 2 and central arch portion 4 to which the forward end 7 of a temple support 8 may be attached. The portion 7, as well as the nose pad supporting arm 6, may be secured to the portion 5 by soldering or other suitable means. The portion 8, shaped to follow the upper contour edge of the lenses in a plane in the rear of the plane of said lenses, as shown in Figs. II and III, is provided adjacent the attaching end 7 with a loop 9 by means of which the portion 8 may be lengthened or shortened, as desired. The portions 8 terminate adjacent the upper temporal edge of the lenses with relatively long rearwardly curving portions 10, having temple attaching ends 11 to which the temples 12 are pivotally attached. The portions 8 may be formed of relatively rigid and pliable material or of resilient material, as desired, or may have portions thereof, particularly the loop portions, formed pliable and adjustable and a portion of the remainder thereof formed resilient yet adjustable. It is particularly pointed out that the temple ends 11, as shown in Fig. I, are located higher up on the lenses than the lens strap connections 2.

It is apparent that when lenses of different sizes and having different upper contour shapes are secured to the lens straps 2 that the portions 8 may be shortened or lengthened to compensate for any change in the width of lenses and may be bent substantially to the shape of the upper contour edge of the lenses. This arrangement enables the temple hinge connections 11 to be positioned a specified distance above the lens strap connections 2 in order to obtain unobstructed side vision or to position the temples above the useful field of side vision.

The portions 8, in addition to being adjusted to the general contour shape of the upper peripheral edge of the lenses, are also adjusted to the inner surface shape of said lenses adjacent said upper peripheral edges as shown in Fig. II.

In instances wherein the facial dimensions of the individual for whom the mounting is being formed are relatively wide, or narrow, as compared to the distance between the pupils of the eyes of said individuals, these differences may be compensated for by adjustment of the portions 10 toward or away from each other, as required. It is also possible with the above described construction to increase or decrease the length of the portion 10 as desired, by increasing or decreasing the length of the intermediate portion 8. These adjustments may be accomplished by means of the adjustable loops 9. The adjustable loops 9, when the mounting is in position of use, lie in the rear of the depending portions 5 and are substantially concealed from view when the mounting is viewed from the front.

If desired, the portions 8 may be formed relatively rigid and the portions 10 only formed relatively resilient. This will permit free flexing of the temples substantially independently of the portions 8.

It is to be noted that the depending portions 5 are formed to such a length as to lie substantially in the plane of the lenses to provide means whereby the ends 7 may be attached at different positions throughout the lengths of said depending portions. This arrangement functions in combination with the loops 9 in obtaining an accurate fit with the upper contour edges of the lenses as well as compensating for differences in the heights and widths of said lenses. The ends 7 may, therefore, be attached to the depending portions 5 at any point intermediate the upper central arch portion thereof and the location of the lens holding means 2.

From the foregoing description, it will be seen that simple, efficient, and economical means and methods have been provided for obtaining a unitary lens supporting structure which may be adjusted to meet the requirements of different shapes and sizes of lenses and changes in the facial characteristics of different individuals.

Having described my invention, I claim:

1. In a device of the character described the combination of a pair of lenses, bridge means having depending side portions shaped substantially to the contour shape of the nasal edges of said lenses and connected with said lenses by lens holding means, and bar-like temple supports attached to said depending side portions and extending therefrom to lie in a plane in the rear of and to follow the upper contour edges of said lenses substantially throughout the extent of said upper contour edge and terminating in temple connections, said bar-like supports being free for adjustment and flexing substantially throughout their entire lengths and each having a loop portion adjacent its nasal end and extending rearwardly from said bridge member with one end of each loop continuing into the attachment of its related temple support through said bridge depending portion and the other end continuing so as to lie in a plane in the rear of and to follow the upper contour edge of the lens adjacent its related temple support whereby said supports may be adjusted to lie in the rear of and to follow the upper contour edges of a variety of lenses of different sizes and shapes while maintaining the said temple connection portions and the said bridge means in the same positions relative to the lenses for any of the lenses.

2. In a device of the character described the combination of a pair of lenses, a lens supporting structure comprising bridge means having a central arch portion and end portions for supporting the lenses in spaced relation, lens holding means connecting said supporting structure to said lenses, and bar-like temple supports extending from adjacent the bridge member to lie in a plane at the rear of and to follow the upper contour edges of said lenses substantially throughout the extent of said contour edges and terminating in temple connections, said supporting structure having portions adjacent the nasal sides of the lenses extending substantially parallel with the rear surfaces of the lenses, said bar-like supports each having a loop portion adjacent the nasal end thereof with each of said loop portions having an end secured at the rear of a respective parallel portion of the supporting structure and each having an opposed portion continuing from the looped portion so as to lie in a plane in the rear of and to follow the upper contour edge of the lenses and terminating in a temple hinge connection whereby said supports may be adjusted to lie in the rear of and to follow the upper contour edge of a variety of lenses of different shapes and sizes while maintaining the said temple connection portions and the bridge means in the same position relative to the lenses for any of said lenses.

EDWARD M. SPLAINE.